Nov. 16, 1926.  H. V. BELL ET AL  1,607,426
LOCK FOR TRANSMISSIONS AND OTHER PURPOSES
Filed March 13, 1924   2 Sheets-Sheet 1
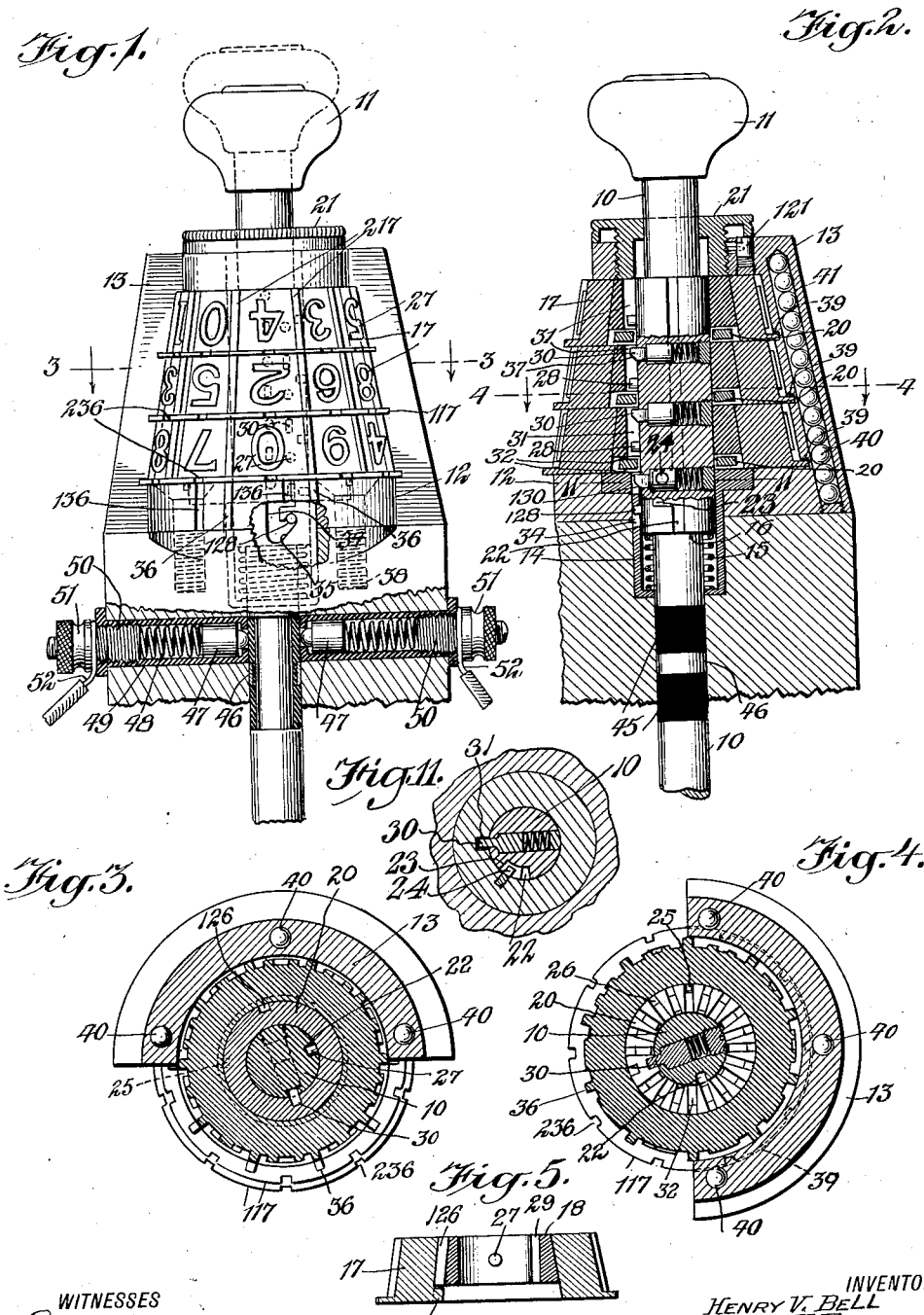
INVENTORS
HENRY V. BELL
HERBERT E. EASTMAN Nov. 16, 1926.
H. V. BELL ET AL
1,607,426
LOCK FOR TRANSMISSIONS AND OTHER PURPOSES
Filed March 13, 1924   2 Sheets-Sheet 2
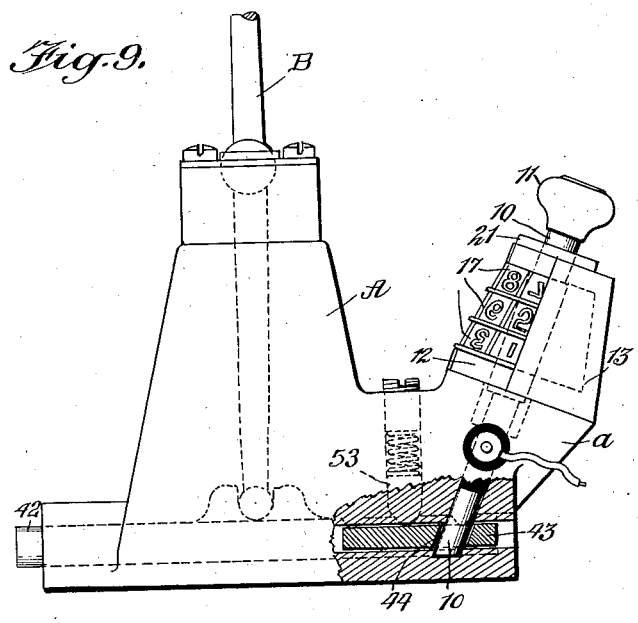
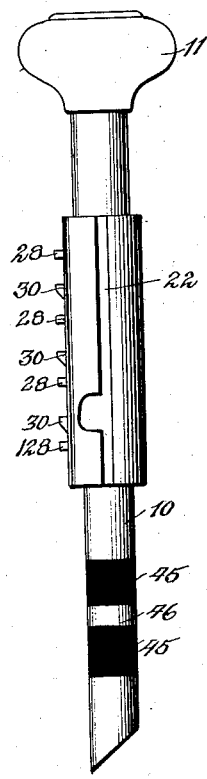
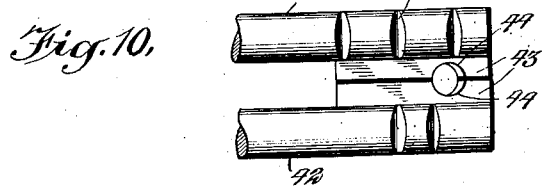
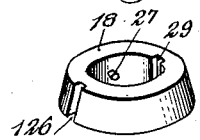
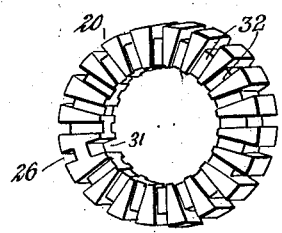
WITNESSES
INVENTOR
HENRY V. BELL
HERBERT E. EASTMAN
BY
ATTORNEYS Patented Nov. 16, 1926.

1,607,426

UNITED STATES PATENT OFFICE.

HENRY V. BELL, OF NEW YORK, AND HERBERT E. EASTMAN, OF EATON, NEW YORK.

LOCK FOR TRANSMISSIONS AND OTHER PURPOSES.

Application filed March 13, 1924. Serial No. 699,011.

Our invention relates to a locking device adapted for engaging a movable part to prevent movement of the same, the invention having particular usefulness in locking a movable part of an automobile such as a shift gear lever to prevent stealing or surreptitious use of the automobile.

The general object of our invention is to provide a combination lock so constructed and arranged as to make it extremely difficult for an unauthorized person to remove the lock or to solve the combination.

A further object of the invention is to provide means to coordinate the lock spindle with shift gear rods operated by a shift gear lever and in a manner that the spindle can be moved to locking position only when the shift gear is in neutral.

A specific object of the invention is to provide a lock in which the axial movement of a spindle to locking or operative position serves to lock the spindle against movement and which construction also is characterized by the adaptability of the spindle to move forward to lock itself regardless of the relative positions of the dials or tumblers.

A further object of the invention is to provide a resistance to take the thrust of the spindle when the dials are in approximate register so that the same "feel" is presented to tamperers even when the parts are arranged for permitting the spindle movement.

An object also is to provide simple means whereby the maximum number of combinations may be made.

The manner and means whereby the above and other objects are attained will clearly appear as the description proceeds.

Reference is to be had to the accompanying drawings forming a part of this specification, it being understood that the drawings are merely illustrative of one example of the invention.

Figure 1 is a side elevation of a lock embodying our invention with parts broken away and in section;

Figure 2 is a longitudinal section of our improved lock;

Figure 3 is a cross section on the line 3—3, Figure 1;

Figure 4 is a cross section on the line 4—4, Figure 2;

Figure 5 is a vertical section through one of the tumblers with part removed, the view showing the tapering character of the bushing;

Figure 6 is a side elevation of the spindle;

Figure 7 is a perspective view of the tapered bushing of the tumbler;

Figure 8 is a perspective view of the inner tumbler ring provided for changing the combination;

Figure 9 is a partial side elevation and partial section of the lock illustrating its mode of engagement with the shift gear rods;

Figure 10 is a fragmentary plan view of the outer ends of the shift rods formed in accordance with our invention to receive and be locked by the spindle of our improved lock.

Figure 11 is a transverse detail section taken as on line 11—11 of Fig. 2.

In carrying out our invention in accordance with the illustrated example a spindle 10 is provided having a head knob 11 at the outer end in practice to facilitate the turning of the spindle. The spindle 10 is mounted for limited longitudinal and limited turning movement in a frame 13 having a base 12 adapted to be secured for example to an extension $a$ of a housing A appurtenant to a shift gear lever B of an automobile. Adjacent the inner end the spindle 10 passes through a casing 14 adapted to be fitted to the housing A, or other structure within which casing 14 is a coil spring 15 abutting at one end against the outer end of said casing, said spring abutting at its inner end against a shoulder 16 on the spindle 10.

Turnable on the spindle 10 are ring dials or tumbler rings 17. Within each ring 17 is a bushing 18. Within the tumbler rings 17 also, and comprising parts of the tumblers, are separate internal rings 20. The rings 17, bushings 18 and the inner rings 20 are turnable about and concentric with the spindle 10. At the outer end of the frame 13 is a ring nut 21 surrounding the spindle and having threaded engagement with said frame at the outer end. A spring pressed locking member 121 locks the nut 21 in position and is inaccessible to be thus proof against tamperers.

The spindle 10 is formed with a longitudinal groove 22 and with a lateral recess 23 complementary to said groove 22 adjacent the inner end thereof. A pin 24 on base 12 extends radially inward at the interior of said base at the recess 23 and permits limited turning movement of the spindle to the extent of the joint width of said recess 23 and the groove 22 for a purpose hereinafter described.

The outer shell or member of each ring 17 has at the interior thereof a pin 25 projecting radially inward and accommodated in any one of a series of slots 26 formed in the inner ring 20 at the periphery, parallel with the axis thereof. On each bushing 18 at the interior is a pin 27 projecting radially inward and extending into the groove 22 of spindle 10.

On the spindle 10 along a line 90° from the slot 22 is a plurality of pins 28 in longitudinal series, three of which pins are provided in the present example to enter internal grooves 29 formed in the bushings 18, parallel with the axis. A fourth pin 128 in line with the pins 28 is disposed nearer the inner end of the spindle, which pin 128 is adapted to have movement in a slot 34 in the casing 14, said slot having a hook-shaped or returned end formed with a cam surface 35. In addition to the pins 28 adapted to have longitudinal movement in the grooves 29, the spindle 10 is also provided with wards 30 radially disposed and spring-pressed to recede within the spindle or to project laterally beyond the same, the back surfaces 130 of the wards 30 being bevelled. The wards 30 are adapted also to pass through an internal longitudinal groove 31 in each inner ring 20 whenever the grooves 31 of the several rings 20 are alined, to thereby permit the spindle to be moved axially until the outermost pin 28 contacts with the nut 21. In the axial movement of the spindle with the several grooves 31 of the respective rings 20 alined, the wards 30 pass respectively through the grooves 31 into the grooves 29 of the bushings 18.

In addition to the groove 31 in each ring 20 to permit the passage of the wards 30 in the outward movement of the spindle, said rings 20 have blind recesses 32 in the front and back surfaces. Thus, in an attempt to move the spindle a slight longitudinal movement of the spindle rearwardly, or forwardly, will cause the wards 30 to enter the respective blind recesses 32 in rings 20.

The purpose of the bevels 37 on wards 30 is to permit the spindle 10 to be moved inwardly, that is to say, in the direction away from the operator irrespective of the relative positions of the tumblers and thus it is not necessary for the inward or rearward movement of the spindle with the grooves 29 and 31 in the respective bushings 18 and inner rings 20 to be in register. Hence, the spindle may be moved to the locking position at all times regardless of the relative positions of the tumblers.

In the illustrated example of our invention the ten digits, 1 to 0, are produced on the periphery of each tumbler ring 17 and we provide gage means to indicate the relative positions of the tumblers 17 and spindle 10 in the illustrated example as follows: On the base 12 or other convenient part of the frame 13 are grooves, ribs or lines. We have shown ribs 36 and a given distance therefrom grooves 136. The tumblers 17 are formed with external annular flanges 117 to be hereinafter referred to, and in said flanges are gage notches 236. Furthermore, longitudinal peripheral ribs 217 are produced or equivalent grooves as gage members. Assuming the combination is 4—2—0 as indicated at the center of Figure 1, then the ribs 217 at each side of the combination 4—2—0 will register with the ribs 36 on the base 12 in order to position the spindle to have the movements necessary for unlocking of the spindle.

The pin 128 and the cam surface 35 effect a limited turning movement of the spindle 10 and tumblers 17 to move the spindle to unlocking position the amplitude of the turning movement being represented by the distance between the ribs 36 and the associated grooves 136 so that in the turning of the spindle the ribs 217 at each side of the combination 4—2—0 will register with the grooves 136.

With the inward movement of the spindle 10 the pin 128 will pass into the groove 34 and contact with the bevelled cam surface 35 to position the pin 128 in the locking end of the groove 34. It will be observed from Figure 1 that said groove 34 is on a line at a side of the line of the pins 28, 128 and wards 30. In practice to withdraw the spindle from the locking position, the slots 31 are all brought into alinement with the pins 28, 128 and the wards 30 pertaining to the respective tumblers. With the given combination (4—2—0) brought into position for the spindle to be unlocked by the registering of the ribs 217 with the ribs 36 the spindle cannot yet be moved rearwardly because at this time the pin 128 is in the returned or hook-shaped end of the slot 34. Hence, the spindle cannot be moved axially to the release position for unlocking until it has first been moved inwardly to cause the pin 128 to engage the cam surface 35, thereby deflecting the pin 128 and giving a slight turning movement to spindle 10 to bring said pin 128 in line with the longitudinal groove portion 34. Undue turning of the spindle is prevented by the pin 24 in the recess 23 since said pin has only a limited clearance for its lateral movement in said recess 23.

The slight turning of the spindle 10 will have brought the ribs 217 into line with the indicating grooves 136, whereupon the spindle 10 may be withdrawn because at this time the grooves 29 of the respective bushings 18 and the grooves 31 of the respective inner rings 20 will all be in register permitting the wards 30 to move through the respective rings 20 into the grooves 29 of the bushings 18. The spring 15 maintains the wards 30 pressed against the rings 20 and whenever a blind recess 32 is presented by a tamperer manipulating the spindle 10, the wards 30 will move into said blind recesses 32. Even if the grooves 29 and 31 are all alined the spindle will still not move outwardly to the outer position owing to the locking of the pin 128 in the returned end of groove 34 which takes the thrust of the spindle when the grooves 29 and 31 are in register and no resistance is opposed to the outward movement of the wards 30, the locking or resistance offered the pin 128 being removed only by an inward movement of the spindle prior to the outward movement. We would here state that the tapering of the bushing 18 and the corresponding internal bore of the outer shell of the tumbler ring 17 prevents forcing of said bushing 18 out of the tumbler rings longitudinally of the spindle 10. In order to increase the number of combinations to which the lock may be adjusted we form the inner ring 20 as clearly shown in Figure 8 with grooves 32 in greater number than the digits on the exterior of the tumbler rings, there being 20 of such grooves 32 in the illustrated example which arrangement enables combinations to be produced representing two rows of digits. Thus, for example, a row adjacent to the row of digits 4—2—0 previously referred to, thus making the combination 40—25—07. When the combination is set for the last-mentioned numerals the notch 236 in line with the row of digits 4—2—0 is brought into register with one rib 36 and the notch 236 in line with the row of figures 0—5—7 is brought into register with the second rib 36.

The frame 13 is held in place by screws or bolts 38 passing through the base 12 and into the housing or other support and it will be observed that with the tumblers in position the screws or bolts 38 are not accessible so that it is impossible for an unauthorized party to remove the lock since to do so requires a knowledge of the combination, whereby the spindle 10 may be removed to permit displacement of the tumblers composed of the rings 17 and inner rings 20 in their own planes laterally from the frame 13.

To further safeguard the lock against tampering, the annular flanges 117 on the tumblers 17 enter semi-circular grooves 39 in the frame 13 and resist any forcible displacement of the tumblers along the spindle 10 even if the nut 21 should be removed. An additional safeguard is provided in the form of a series of steel balls 40 in longitudinal closed and sealed pockets 41 in the frame 13. The balls 40 prevent a saw from being effective in any atempt to saw off the frame 13 since the balls will turn by engagement of the saw teeth.

In order to effect a locking engagement between the spindle 10 and the usual gear shift rods 42, we provide on said rods web members 43 disposed toward each other and formed with semi-circular recesses 44 which jointly accommodate the spindle 10 when said recesses 44 are disposed opposite to each other which in practice is only in the neutral position of the gear. Hence, the lock can be operated only when the shift rods 42 have placed the gear in neutral and it follows that the provision of the engagement of the lock bolt or spindle 10 with the shift rods 42 will compel the driver of an automobile to throw his gear into neutral before he can operate the lock and it follows also that the movement of the lock spindle to locking position positively insures the locking of the gear and thereby prevents the operation of the automible motor.

The spindle is utilized also as a circuit control device for which purpose an insulating sleeve 45 is provided on said spindle and between the ends of said insulating sleeve a conducting band 46 is fitted. In association with the insulating sleeve 45 and its conducting band 46, two plungers 47 are provided, acted on by coil compression springs 48 in bushed transverse holes 49, said holes closed by screw plugs 50 receiving on the reduced outer ends binding nuts 51 for binding conductor terminals 52. The plungers 47 are disposed at opposite sides of the spindle 10 and when the spindle is in unlocking position, said plungers engage the insulation 45. When the spindle 10 is withdrawn to the release or unlocking position, the conducting band 46 receives contact of the plungers 47 and bridges the same, thereby closing the circuit between the conductor terminals 52.

The numeral 53 indicates a known expedient in the form of a spring-pressed pin adapted to engage notches 54 in the shift rods 42.

Reverting to the pins 25 and grooves 26, it will be obvious that with the parts disassembled the inner ring 20 may be moved out of the ring 17 and said ring 20 turned to engage the pin 25 in any one of the grooves 26 to bring the pin into radial position with the digits on the tumblers or ring dials to thus vary the combination of the lock.

The numeral 126 in Figures 3, 5, and 7 indicates a groove in the tapering exterior of the bushings 18. Said groove has in view the assembling of the parts and the groove 126 referred to extends from the top surface of each bushing to the bottom surface and enables the bushing to be moved past the pins 25.

We would state in conclusion that while the illustrated example constitutes a practical embodiment of our invention, we do not limit ourselves strictly to the exact details herein illustrated, since, manifestly, the same can be considerably varied without departure from the spirit of the invention as defined in the appended claims.

Having thus described our invention, we claim:

1. A lock comprising a spindle, a plurality of turnable elements, bushings in said elements and surrounding the spindle, inner rings within said elements, said bushings and said inner rings having internal grooves, pins on the spindle adapted to move in the grooves of the bushings, and spring-pressed wards adapted to be brought into register with and to move through the grooves in the inner rings.

2. A lock comprising a spindle, a plurality of turnable elements, bushings in said elements and surrounding the spindle, inner rings within said elements, said bushings and said inner rings having internal grooves, pins on the spindle adapted to move in the grooves of the bushings, and spring-pressed wards adapted to be brought into register with and to move through the grooves in the inner rings; together with a fixed element, and a member on the spindle adapted to lock with said fixed element.

3. A lock of the class described including a spindle, a plurality of tumblers turnable on the spindle, wards on the spindle appurtenant to the respective tumblers, said tumblers to aline in predetermined positions of the tumblers to permit passage of said wards with a longitudinal movement of the spindle to release position, and coacting means on the spindle and on a fixed part of the lock to temporarily hold the spindle against movement to release position upon alinement of said grooves and wards, said spindle being manually movable to disengage said coacting means and permitting the spindle to be moved to the unlocking position.

4. A lock of the class described including a spindle, a plurality of elements turnable on the spindle, and grooved longitudinally internally, lateral projecting members on the spindle permitting longitudinal movement of the spindle when brought into register with said grooves and opposing movement of the spindle when out of line with said grooves, said turnable elements comprising separate inner and outer rings, the inner ring being adapted to be turned to inner positions in the inner ring, means to lock the inner ring against turning in the outer ring, bushings in the outer ring, and lateral members on the spindle movable in said grooves of the bushings; together with a fixed member having a longitudinal groove formed with a returned hook-shaped end having a cam surface, and a pin on the spindle adapted to move in said groove and to move laterally into the returned end thereof.

5. A lock of the class described including a spindle movable axially to locking or unlocking positions, a fixed casing through which the spindle passes, a spring in the casing tending to move the spindle to unlocking position, said casing having a longitudinal groove formed with a returned end, a pin on the spindle adapted to travel in said groove and into or out of its returned end, a plurality of turnable elements on the spindle, said elements having internal longitudinal grooves, and means on the spindle adapted to pass through said grooves when the grooves of the respective turnable elements are in alinement.

6. A lock of the class described including a spindle movable axially to locking or unlocking position, said spindle having a peripheral groove and a lateral recess complementary to said groove, a fixed member having a pin entering said groove at said recess to limit the turning movement of the spindle, a plurality of turnable elements on the spindle, and coacting means on the turnable elements and on the spindle permitting longitudinal movement of the spindle in certain predetermined positions of the turnable elements and opposing the longitudinal movement of the spindle in other than the predetermined positions of the turnable elements; together with a lateral pin on the spindle and a fixed member having a longitudinal groove into which said pin projects, said groove having a return hook-shaped end and presenting a cam surface.

7. A lock comprising a frame, a spindle turnably and longitudinally mounted in said frame, a plurality of rotary tumblers through which the spindle passes, said tumblers having annular peripheral flanges and said frame having grooves in which the flanges may have turning movement whereby the frame resists the movement of the tumblers along the spindle, and coacting means appurtenant to the spindle and tumblers, said means permitting axial movement of the spindle in predetermined positions of said coacting means.

8. A lock comprising a frame, a spindle turnably and longitudinally mounted in said frame, revoluble tumblers on said spindle, coacting means appurtenant to the spindle and tumblers, said means permitting axial movement of the spindle in predetermined positions of said coacting means, coacting gage means on the tumblers and on said frame, said gage means being disposed in duplicate on the frame, the tumblers having longitudinal rows of symbols and the gage means on the tumblers alternating with the symbols, said tumblers having gage means additional to the first-mentioned gage means and also adapted to be brought into register with the gage means on the frame whereby to indicate a setting of the tumblers different from a setting by the first-mentioned gage means on the tumblers.

9. A lock comprising a frame, a spindle turnably and longitudinally mounted in said frame, a plurality of tumblers through which said spindle passes, coacting means appurtenant to the spindle and tumblers, said means permitting axial movement of the spindle in predetermined positions of the said coacting means, and longitudinal series of steel balls in said frame outside of the tumblers constituting a barrier adapted to be engaged by saw teeth and be turned thereby in an attempt to saw through the frame.

HENRY V. BELL.
HERBERT E. EASTMAN.